US006692255B2

(12) United States Patent
Roberts et al.

(10) Patent No.: US 6,692,255 B2
(45) Date of Patent: Feb. 17, 2004

(54) APPARATUS AND METHOD UTILIZING BI-DIRECTIONAL RELATIVE MOVEMENT FOR REFRESHABLE TACTILE DISPLAY

(75) Inventors: John W. Roberts, Damascus, MD (US); Oliver T. Slattery, Gaithersburg, MD (US); David W. Kardos, Columbia, MD (US); Edwin Mulkens, Gaithersburg, MD (US); Bretton Swope, Gaithersburg, MD (US)

(73) Assignee: The United States of America, Washington, DC (US)

( * ) Notice: Subject to any disclaimer, the term of this patent is extended or adjusted under 35 U.S.C. 154(b) by 0 days.

(21) Appl. No.: 09/921,802

(22) Filed: Aug. 6, 2001

(65) Prior Publication Data

US 2002/0045151 A1 Apr. 18, 2002

Related U.S. Application Data

(63) Continuation-in-part of application No. 09/572,048, filed on May 16, 2000.
(60) Provisional application No. 60/178,699, filed on Jan. 28, 2000, and provisional application No. 60/134,887, filed on May 19, 1999.

(51) Int. Cl.$^7$ .............................................. G09B 21/00
(52) U.S. Cl. ..................................................... 434/113
(58) Field of Search ................................. 434/112, 113, 434/114, 117, 173, 174, 182; 340/407.1, 825.19

(56) References Cited

U.S. PATENT DOCUMENTS

| | | | | | |
|---|---|---|---|---|---|
| 2,521,338 | A | * | 9/1950 | Bryce | 434/114 |
| 2,549,632 | A | * | 4/1951 | Nottingham | 434/114 |
| 3,624,772 | A | * | 11/1971 | GRunwald | 400/109.1 |
| 3,736,672 | A | * | 6/1973 | Skewis et al. | 434/114 |
| 4,500,293 | A | * | 2/1985 | Eltgen | 434/114 |
| 4,551,102 | A | * | 11/1985 | Meinzer | 434/114 |
| 4,650,352 | A | * | 3/1987 | Eriksson | 433/90 |
| 5,474,457 | A | * | 12/1995 | Bromley | 434/311 |
| 5,944,574 | A | * | 8/1999 | Small et al. | 446/149 |
| 6,109,922 | A | * | 8/2000 | Litschel et al. | 434/114 |
| 6,354,839 | B1 | * | 3/2002 | Schmidt et al. | 434/113 |

* cited by examiner

Primary Examiner—Kurt Fernstrom
(74) Attorney, Agent, or Firm—Harold A. Burdick

(57) ABSTRACT

A refreshable Braille reader apparatus and method are disclosed, the apparatus preferably utilizing a rotating cylinder having endless rows of openings defined therethrough to a display surface with a pin held in each opening and freely movable therein. Static actuators at least equal in number to the rows of openings through the cylinder are maintained at a station adjacent to the surface of the cylinder, and are configured and positioned so that the pins are selectively contactable at either of their ends by different ones of the actuators during cylinder rotation in either forward or reverse direction thereby selectively positioning first ends of the pins relative to the surface of the cylinder to allow streaming of Braille text across a display area in either forward or backward order depending upon selected direction of cylinder rotation.

24 Claims, 6 Drawing Sheets

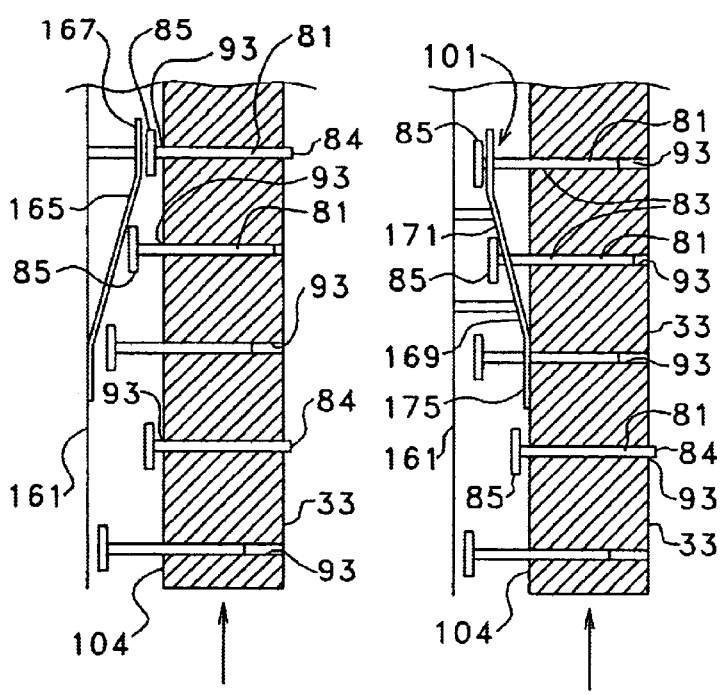
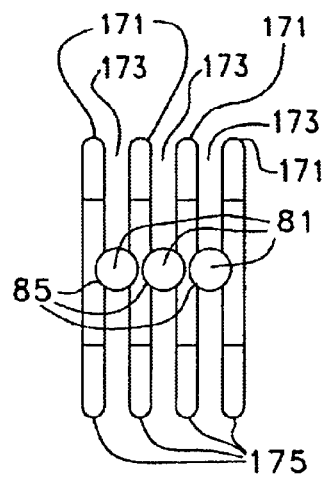
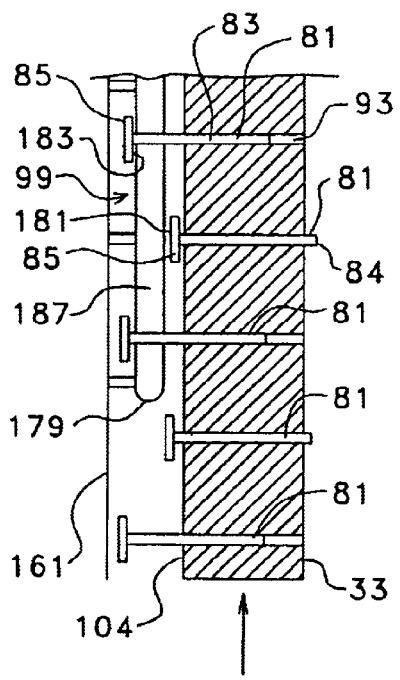
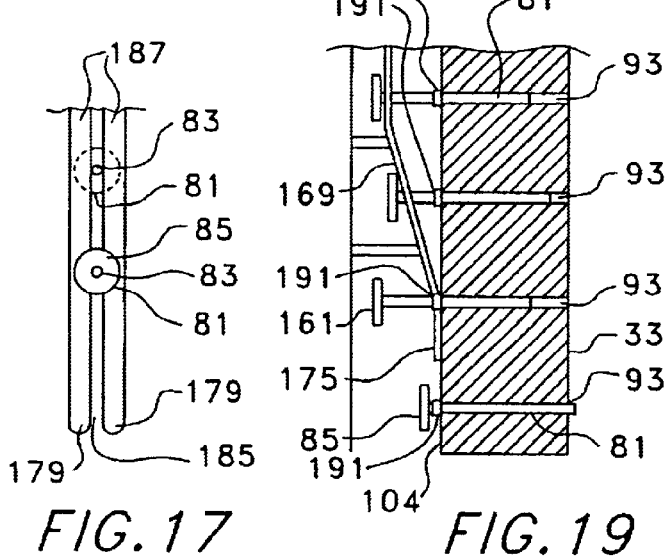
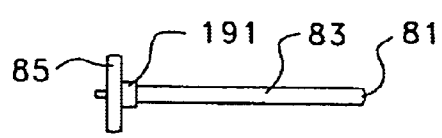
FIG. 13   FIG. 14   FIG. 15   FIG. 16   FIG. 17   FIG. 19   FIG. 18

APPARATUS AND METHOD UTILIZING BI-DIRECTIONAL RELATIVE MOVEMENT FOR REFRESHABLE TACTILE DISPLAY

RELATED U.S. APPLICATIONS

This application is a continuation-in-part of U.S. patent application Ser. No. 09/572,048 which is pending on the date of this application and which is entitled APPARATUS AND METHOD FOR REFRESHABLE TACTILE DISPLAY filed by inventors named herein on May 16, 2000 claiming the benefit of U.S. Provisional Patent Application No. 60/134,887, filed May 19, 1999, and U.S. Provisional Patent Application No. 60/178,699, filed Jan. 28, 2000.

FIELD OF THE INVENTION

This invention relates to tactile display devices and methods, and, more particularly, relates to such devices and methods wherein a tactile display is readily reconfigurable.

BACKGROUND OF THE INVENTION

One of the potential benefits of advances in computer and related technologies is the prospect for improved accessibility to information services for the handicapped, particularly electronically stored or transmitted information. For the blind and vision impaired, work has been done on improved accessibility by special adaptations to visual displays, by voice-based systems (voice output and in some cases voice input), and by touch-based devices. Each of these approaches is particularly useful for certain applications, and serves a certain part of the population of users.

The most common implementation for a touch-based computer-driven display is the refreshable Braille reader. This is a device which produces a pattern of raised dots in the six (or eight) dot cells that represent Braille characters (see U.S. Pat. Nos. 6,109,922 and 4,551,102, for example). Often, the dots are controlled by actuators (typically one per dot in each cell), and can be individually set to change the Braille characters being displayed on each Braille cell. Typically, a single line of Braille is made available, ranging from a relatively short line for a portable device, to 80 characters or more for a device built into a desktop keyboard. These devices produce a usable, refreshable Braille display, but suffer the drawbacks of extremely high cost and mechanical unreliability (due in large part to the great number of mechanical components). Cost and reliability issues have thus hindered the expanded use of Braille as a computer interface.

Some heretofore known full-scale Braille readers may contain hundreds of actuators. Since the traditional method of constructing a refreshable Braille display producing a linear array of Braille cells requires a separate actuator for every dot of every cell in the display, an 80 cell display of 8-dot Braille (per cell) would require 640 actuators. Actuators are the primary expense in traditional Braille displays, and also represent the most likely source of introduced unreliability into the system.

Other heretofore known systems rely on complex systems of magnets (electromagnets and permanent magnets) to move and retain Braille characters. Such systems have not always been found to produce reliable results and/or are expensive to manufacture given the need for specificity and isolation of the magnetic effects from one Braille dot to the next.

Improvement in such devices producing computer-refreshable Braille text for tactile reading by the blind and visually impaired could thus be utilized thereby broadening accessibility to computer services such as electronic books, e-mail and other network access, and general computer use. Improvements in cost and mechanical reliability must be attained in order to facilitate more widespread use of refreshable Braille devices. Mechanical simplicity over existing refreshable Braille devices, while providing much of their functionality as well as additional features, would be desirable for users while greatly lowering cost and improving reliability in comparison to existing systems. Moreover, such systems should be easily reversible and searchable (forward and back) so that a user may review Braille text as necessary and desired by the user.

SUMMARY OF THE INVENTION

This invention provides apparatus and methods for producing refreshable tactile display, in particular refreshable Braille text that can be streamed at a display surface in either forward or backward order by utilizing bi-directional relative movement of components of the apparatus. The apparatus can be produced at a great reduction in cost of manufacture over heretofore known devices while yet realizing greatly increased mechanical reliability and simplicity.

The refreshable Braille reader broadly includes a display assembly having an outer surface with a plurality of openings therethrough, the openings arranged in rows. Pins are mounted in the openings and are movable therein.

The actuating means preferably includes at least a first actuator assembly having actuators at least equal in number to number of the rows of openings in the display assembly surface. Each actuator includes a driver, a shaft selectively extendible and retractable by the driver and first and second contact tips at the shaft. The actuators are positioned so that the first contact tip can selectively contact the first ends of the pins and the second contact tip can selectively contact the opposite ends of the pins.

The actuating means preferably includes at least a first actuator assembly having actuators at least equal in number to number of the rows of openings in the display assembly surface. Each the actuator includes a driver, a shaft selectively extendible and retractable by the driver and first and second contact tips at the shaft. The actuators are positioned so that the first contact tip can selectively contact the first ends of the pins and the second contact tip can selectively contact the opposite ends of the pins.

In the now preferred embodiment of the refreshable Braille reader, a cylinder connected with a motor for rotation thereof in either of two directions is utilized. The cylinder has a cylindrical outer surface a part of which defines a tactile display area and a cylindrical inner surface, the openings extending between the surfaces.

The actuators are statically positioned, are at least equal in number to the rows of openings through the cylinder, and are configured so that the pins are selectively contactable at either of their ends by different ones of the actuators during cylinder rotation in either of the two directions, thereby streaming Braille text across the display area in either forward or backward order depending upon selected direction of cylinder rotation. Controls are provided allowing user selection at least of direction of rotation of the cylinder.

In one embodiment first and second sets of actuators, each set having actuators at least equal in number to number of the rows of the openings, are provided, the first actuator set positioned at one side of the tactile display area and the second actuator set positioned at an opposite side of the tactile display area. The first actuator set selectively causes"

controlled pin movement in the openings for steaming Braille text in the forward order and the second actuator set causes controlled pin movement in the openings for streaming Braille text in the backward order.

The method for streaming Braille text in either forward or backward order at a display area of this invention includes the steps of effecting relative movement in either of two directions between a station and a display surface and selectively activating actuators at the station while effecting the relative movement in a first of the two directions to set pins at selected positions relative to the display surface by contact with the pins. Relative movement in either the first or a second of the two directions is continually effected to selectively reset the pins at selected positions relative to the display surface by selectively activating the actuators at the station to cause contact with the pins.

The implementation of the apparatus of this invention embodied for streaming of Braille text at a display surface and characterized as a rotating cylinder refreshable Braille reader would produce computer-refreshable Braille text for tactile reading by the blind and visually impaired. This implementation will improve accessibility to computer services such as electronic books, e-mail and other network access, and general computer use. The apparatus is designed to be mechanically simpler than existing refreshable Braille reader devices, while providing much of their functionality as well as additional features. The design of this apparatus allows for greatly lowered cost and improved reliability in comparison to existing systems and can be implemented in such a way as to provide refreshable Braille text to the user from a typical reading rate of 60 to 125 words per minute up to a high reading rate of 250 words per minute and in either forward or backward text streams (i.e., forward or reverse cylinder rotation).

The rotating cylinder refreshable Braille reader of this invention addresses cost and reliability issues of heretofore known systems by greatly reducing the number of actuators utilized to set Braille text at a reading surface, from hundreds in heretofore known implementations, to as few as three or four (though as many as sixteen may be desirable) depending on the particular configuration. Instead of a static linear array of Braille cells that the user reads by moving one or more fingers along the line, the rotatable wheel Braille reader herein disclosed sets the Braille dots on the surface of a wheel or disk, which rotates under the user's finger, giving the user the sensation of a line of static Braille text moving under the user's finger. The Braille text on the wheel is refreshed as the wheel rotates, either in a repeating pattern around the wheel, or (using actuators internal or external to the wheel) at a specific point in the rotation of the wheel, setting a pattern of Braille dots on the wheel that are passively retained until they have passed under the reader's finger, after which they may be erased and then rewritten in the next rotation.

The preferred embodiments of the reader apparatus of this invention use a passive pin displacement approach, which can be used as the basis for either an external or internal actuator stationed refreshable Braille display. It can also be adapted to a linear Braille display, to certain types of tactile graphic displays, and may be applicable for non-accessibility application. Multiple Braille cells (potentially a large number) may be deployed displaying a valid text stream to the user. Improved control, precision, reliability of the device, greater versatility of operation, rapid display, long useful service life for the device, and extremely low cost of manufacture compared to now known systems will be achieved. The apparatus of this invention also utilizes means for replacing substantially continuously powered actuators with passive position retention, thereby greatly lowering the cost of manufacture and operation of a Braille display in a robust and mechanically simple manner.

It is therefore an object of this invention to provide improved apparatus and methods for producing a refreshable tactile display.

It is another object of this invention to provide apparatus and methods for streaming a tactile display at a display area.

It is another object of this invention to provide apparatus and methods for producing refreshable Braille text that can be streamed at a display surface in either forward or backward order by utilizing bi-directional relative movement of components of the apparatus.

It is another object of this invention to provide improved tactile display apparatus producing computer-refreshable Braille text for reading by the blind and visually impaired to improve access to computer services such as electronic books, e-mail and other network access, and general computer use.

It is still another object of this invention to provide a refreshable Braille reader apparatus that is mechanically simple and reliable, compact, lower in cost, fast, and that provides improved control, precision, and versatility of operation including providing either forward or backward text streaming capability.

It is another object of this invention to provide a refreshable Braille reader including a display assembly having an outer surface, the surface having a plurality of openings therethrough with the openings arranged at the surface in rows, a plurality of pins having first and second ends, each one of the pins mounted in a different one of the openings and movable therein, and actuating means maintained at a station adjacent to the surface of the display assembly for moving the pins, the pins selectively contactable by the actuating means to move the pins in the openings so that the first ends of the pins are selectively raised from or not raised from the surface, at least one of the actuating means and the display assembly being movable relative to the other of the actuating means and the display assembly in either of two directions, the actuating means capable of causing controlled pin movement in the openings while relative movement occurs in either of the two directions.

It is still another object of this invention to provide a refreshable Braille reader including a cylinder connected with a motor for rotation thereof in either of two directions, the cylinder having a cylindrical outer surface a part of which defines a tactile display area and a cylindrical inner surface, the cylinder having a plurality of openings therethrough between the surfaces, the openings arranged in at least three endless rows, a plurality of pins having first and second ends, each one of the pins mounted in a different one of the openings and movable therein, static actuators at least equal in number to the rows of openings through the cylinder maintained at a station adjacent to the cylinder, the actuators positioned and configured so that the pins are selectively contactable at either of the ends by different ones of the actuators during cylinder rotation in either of the two directions so that the first ends of the pins are selectively positioned relative to the outer surface of the cylinder thereby streaming Braille text across the display area in either forward or backward order depending upon selected direction of cylinder rotation, and user controls allowing control at least of direction of rotation of the cylinder.

It is yet another object of this invention to provide a method for streaming Braille text in either forward or backward order at a display area including the steps of effecting relative movement in either of two directions between a station and a display surface, selectively activating actuators at the station while effecting the relative movement in a first of the two directions to set pins at selected positions relative to the display surface by contact with the pins, and effecting relative movement in either the first or a second of the two directions to selectively reset the pins at selected positions relative to the display surface by selectively activating the actuators at the station to cause contact with the pins.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 13 is a simplified illustration of a passive default positioning device usable with the apparatus of FIG. 2;

FIG. 14 is a simplified illustration of a passive default positioning device usable with the apparatus of FIG. 6;

FIG. 15 is top view of the default positioning device of FIG. 14;

FIG. 16 is a simplified illustration of a position retaining device usable with the apparatus of this invention;

FIG. 17 is partial bottom view of the retaining device of FIG. 16;

FIG. 18 is a side view of an alternative pin design usable with the apparatus of this invention;

FIG. 19 is a simplified illustration of an alternative pin/aperture arrangement usable with the apparatus of this invention;

DESCRIPTION OF THE INVENTION

The most common method of reading Braille is to slide one or more fingertips across a line of Braille characters, relative motion of the Braille text and the fingertip being necessary for the sensation of touch that permits the most efficient reading of Braille. The user may tend to skip quickly over "expected" characters, and occasionally to backtrack to re-read or confirm some characters. Reading is usually on a word by word basis.

Figure 1:
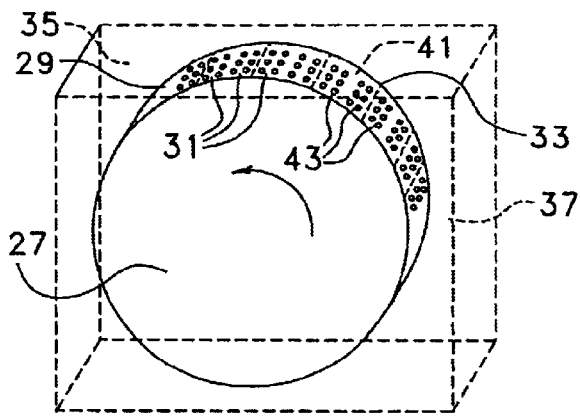
FIG. 1 is simplified illustration of an apparatus in accord with this invention.

In its most general terms as shown in FIG. 1, the preferred embodiment of the invention described herein replaces a line of refreshable Braille characters with a rotatable assembly streaming text across a reading area, for example (in one embodiment) including a wheel or cylinder 27. Wheel 27 (a cylinder, disk or the like) has an outer rim with height at its outer edge (or face) 29 at least equal to the height of a Braille character, with refreshable Braille characters definable at a selected surface characteristic 31 at tactile display surface 33 along outer edge 29 of the wheel 27 (around the cylinder face) and rotatable about the axis of the cylinder.

Figure 2:
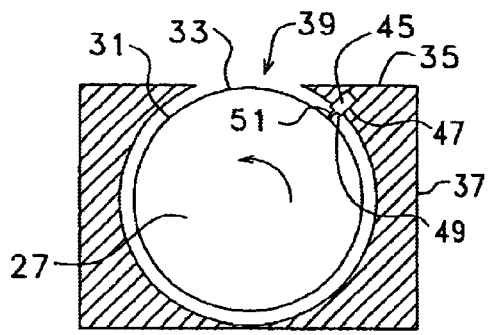
FIG. 2 is simplified illustration of another apparatus in accord with this invention.

Wheel 27 is recessed into surface 35 of housing 37 so that only a small portion of the cylinder (for example, the width of two Braille characters) is exposed above surface 35 at a display area (or reading aperture) 39 (see FIG. 2). The user places a finger on the exposed surface of the wheel. Instead of the user sliding a finger along a motionless line of Braille characters, the rotation of the wheel causes the Braille characters to slide (or stream) past the finger, allowing them to be read.

With the primary objectives of this design in mind (to create a Braille reader with greater mechanical simplicity and reliability and at a lower cost than existing Braille readers), several alternative embodiments for implementation of the objectives are realized.

Actuators may be placed within cylinder 27 or along a shaft on which the cylinder rotates. Braille cells 41 are organized in sets of two characters 43, with an even number of characters around cylinder 27. Aperture 39 through which the user feels the Braille characters on display surface 33 of cylinder 27 is preferably of a width to allow no more than two characters to be felt at one time. With a six-dot Braille code, up to twelve actuators are used to control two character cells (depending upon design choice). For eight-dot code, up to sixteen actuators are used. At any given instant, all two character cell pairs around cylinder 27 are displaying the same pattern. Therefore, only twelve actuators are needed to control all cells 41 on cylinder 27, with the motion from each actuator distributed to the corresponding Braille dot mechanism in all cells. The actuators are controlled by a computational device so that what the user feels through aperture 39 is a string of Braille characters. The actuators must therefore be fast enough to change the pattern of dots on a serial basis to provide the desired reading speed.

The method of distribution of actuator activity to its multiple corresponding dots may be by flexible cable directed through a channel, by solid linkages, or by a combination of the two. The greater the number of cells (character pairs) on cylinder 27, the flatter reading surface 33 will seem to the user, but such an increase will also increase the size of the device, and the force the twelve actuators must provide to operate all the cells. The number of cells on cylinder 27 will be set by a design compromise of these factors.

As illustrated in FIG. 2, in an embodiment employing external actuator assembly 45 statically positioned at a station 47 of housing 37, cylinder 27 contains no active components. The pattern of dots making up Braille characters is set in cooperation with surface characteristic 31 of cylinder 27 by external actuators 49 in assembly 45 (only one shown) before they move into reading aperture 39 for detection by the user. In this embodiment, six dots (for six-dot Braille code, arranged in two columns of three dots each) form each Braille cell (i.e., one character in six-dot Braille), and dots are arranged around display surface 33 in three endless rows (see FIG. 1 for an example of this arrangement of rows, it being understood that for eight-dot Braille code eight dots arranged in two columns of four dots each form a cell, there being four endless rows arranged around display surface 33). This allows the reader apparatus of this invention to operate with as few as three actuators 49 in the assembly creating a stream of Braille characters at reading aperture 39 as relative motion between surface 33 and actuator station 47 (in a direction substantially parallel to one another) continues. This represents a substantial reduction compared to the hundreds of actuators that may be required for existing readers (a slight increase in the number, for example to six actuators, may allow slower actuators to be used, by splitting the task of setting the dots).

There are several ways by which the Braille dots may be formed at display surface 33 (i.e., defining a selected surface characteristic 31) of cylinder 27 by actuators 49. The individual dots may be defined by numerous (one for each dot) spring-loaded push-on, push-off pin devices mounted in openings (corresponding to the dots) in cylinder 27 such as are used in certain push-button switches or in retractable ball-point pens. A push from an actuator shaft 51 causes an individual pin to switch state, from "in" (not extended from the cylinder surface) to "out" (extended from the cylinder surface), or vice versa. The controlling device preferably keeps track of the status of every dot in every cell on the cylinder, and when refreshing the text either reverses the status of dots or allows them to remain unchanged on a dot-by-dot basis, according to the requirements of the new text (though refreshing could occur merely by returning all pins to a default state after reading, for example the unextended position, by mechanical means before resetting by actuators 49 as discussed hereinafter).

Other passive mechanical means of forming the dots could be utilized. For example, pins shaped as small cylinders or spheres which are flattened on one side and which can be rotated about individual axes in openings in the cylinder by the actuators could be utilized. The cylinders or spheres would be shaped and contained so that rotation while passing across the user reading area and when being contacted by the user's fingers is prevented.

In yet another embodiment, the selected surface characteristic 31 of cylinder 27 can be a mechanically plastic material covering outer surface 33 of cylinder 27 and into which actuators 49 press a pattern of Braille text characters as it moves past, and which is capable of such character retention through reading area (or aperture) 39. After passing reading area 39, rollers or similar such devices are provided to flatten (and thus reshape so that no impressions remain) the surface of the plastic material, thereby providing a blank, unwritten, surface 33 for new text to be written. The plastic material must be sufficiently stiff to permit reading without undue deformation of the material, but sufficiently pliable to permit writing, flattening, and rewriting.

Figure 3:
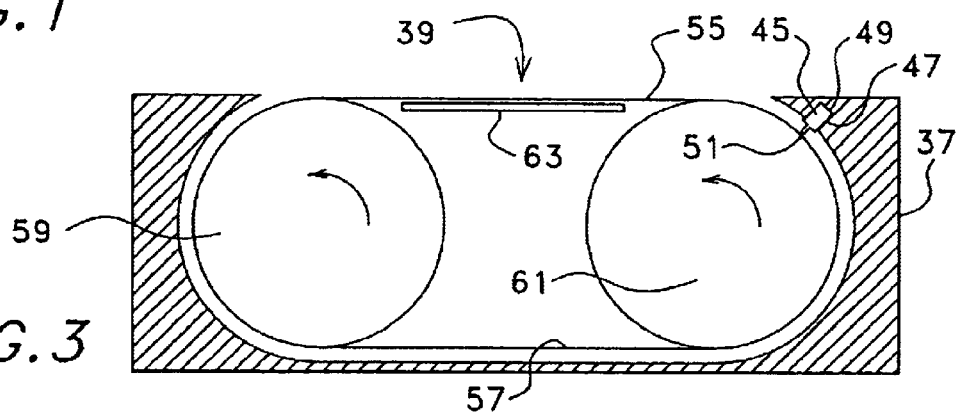
FIG. 3 is simplified illustration of yet another apparatus in accord with this invention.

In still another embodiment, shown in FIG. 3, the Braille dots are externally set in a mechanically plastic material as described above with respect to FIG. 2, but instead of being set on surface 33 of wheel 27, they are set on surface 55 of belt 57 moving around two wheels 59 and 61. Instead of one or two characters being exposed at any given time at reading aperture 39, several characters, up to an entire line of Braille text, are exposed. Back plate 63 keeps belt 57 from flexing while the user reads the Braille at reading aperture 39. This method sacrifices some simplicity for the ability to display an entire line at a time.

The user may choose to operate such a display in any of several different modes. The display can be configured to update continuously and with wheels 59/61 rotating continuously. The user places a finger where the text first appears, and stops the motion of the display in order to re-read characters that have just moved past the finger. Alternatively (depending upon reading aperture size), the display can be configured to update an entire line at a time, and is then stopped while the user reads the entire line. When deploying the display apparatus of this invention in this mode, belt 39 can be made wider, and more actuators 49 can be added, so more than one line can be displayed at a time if desired. With a sufficiently long line of actuators and a sufficiently wide belt, an entire page of Braille text can be updated and displayed at once.

Moreover, where a multiple-line extended Braille text display is desired, separate belts 57 (and drive wheels 59/61) may be provided for each line of text. This would allow for utilization of much slower actuators 49. While the user is reading one line, other lines are slowly being updated. Satisfactory throughput can be provided even if the individual actuator groups in assembly 45 (triads, for example, for six-dot Braille) produce Braille text at a fraction of the user's reading speed.

Figure 4:
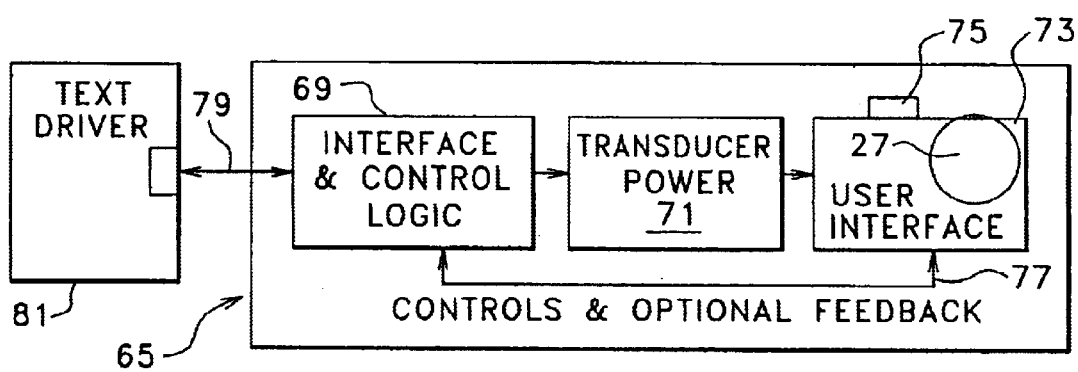
FIG. 4 is a block diagram of implementation of the tactile display apparatus in accord with this invention.

FIG. 4 shows an example of one method of implementation of refreshable Braille reader 65 in accord with the various embodiments of this invention. This implementation includes interface and control logic 69, power electronics 71 to drive the transducers (actuators) and rotation of Braille wheel 27, and physical user interface 73. The physical user interface includes Braille wheel 27 and additional controls 75 such as stop, start, forward and reverse buttons and a speed control for adjustment of the speed of rotation of Braille wheel 27 to provide a desired reading rate.

In addition to signals from user controls 75, feedback path 77 may include signals from sensors (discussed herein below) that observe the performance of Braille wheel 27, in order to detect any errors and/or to tune performance. A standard port interface 79 (which may be a parallel port, serial port, USB, or infrared link, for example) connects reader 65 to text driver device 81 such as an electronic book reader, a PDA, or a notebook or desktop computer. Text driver device 81 is programmed to provide the signals needed by Braille reader 65 over port connection 79 to control logic 69.

It is the responsibility of the control system to produce the appropriate Braille text and to respond to user input. The commands the user may wish to send to reader 65 at controls 75 include those which are typical of an electronic book reader (move forward, move back, bookmark, dictionary and the like), and commands which are specific to the motion-based Braille reader of this invention. The latter class of commands may include start/stop, speed adjustment and repeat (play back of words to clarify an uncertainty or search for data). A display protocol may be implemented to aid identification of changes in context, as when the user jumps to a different location in text or looks up a reference. One example of such a protocol includes a separator (a brief blank interval, for example) whereby cylinder 27 rotates but nothing is displayed.

Adjustment of the speed of rotation of Braille wheel 27 (and thus the rate at which text is displayed) must be provided for adaptation to different users, and also for adjustment by a particular user for different applications (reading for entertainment, reading for study, and the like). A typical expert reading rate for Braille may be considered as 125 words per minute, which translates to roughly 32 Braille characters per second generated, and 20 cm/s motion of wheel surface 33 at display aperture 39. A very fast reading rate would be considered 250 words per minute. Ability to produce text at the desired reading rate range defines the performance requirements for transducers 49 to be used to produce the Braille characters.

Figure 5:
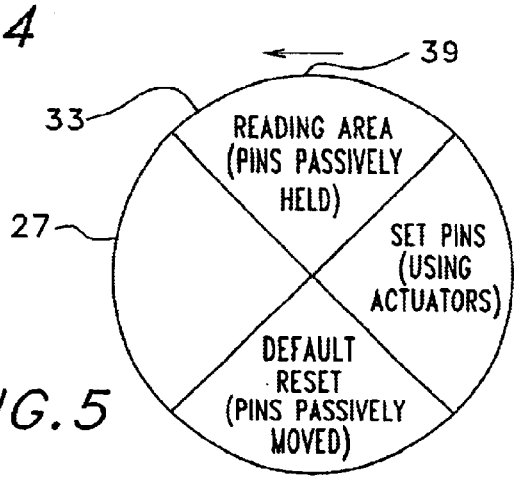
FIG. 5 is a process flow diagram of a preferred embodiment of the tactile display apparatus of this invention.
Figure 6:
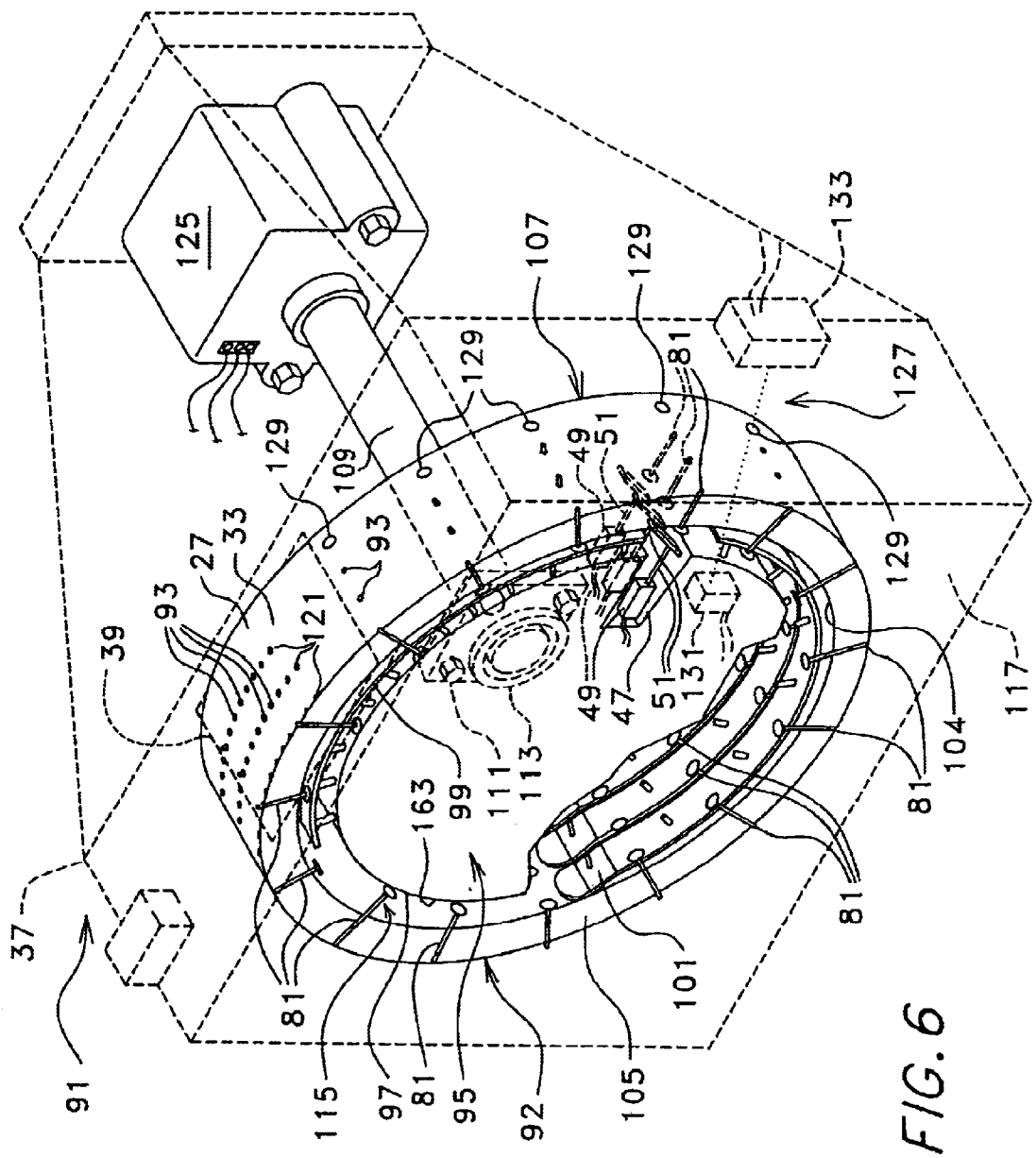
FIG. 6 is a simplified illustration of a preferred embodiment of one display apparatus of this invention, with portions illustrated representationally and/or cut away and/or exaggerated for better illustration of the principles thereof.

Turning now to FIGS. 5 and 6, a passive pin displacement system for use with either an internal or an external (FIG. 2) actuator reader design is illustrated. Unlike other methods in which Braille dots are mechanically deformed in order to store their binary status (raised dot or no dot) after writing, this system employs, as the selected surface characteristic 31 of wheel 27, pins that are mechanically simple and passively manipulated or retained in position by the physical structures they encounter during the course of rotation of wheel 27. Active control is used only at the point where the actuators set the text on wheel 27 by manipulation of the pins.

Referring to FIG. 5, a collection of actuators (typically three for six-dot Braille or four for eight-dot Braille) set the positions of the pins described hereinafter (raised or lowered relative to reading/display surface 33) one column at a time, for each of the three or four endless rows of dots (one actuator acting in each row). A Braille cell contains two columns of three or four dots, so two write operations are required to write each Braille cell.

After the Braille dots are written, they immediately move into contact with a physical structure that they slide along as the wheel rotates, the structure holding the pins in whatever position they are set by the actuators (either raised or lowered). This structure underlies the entire reading area 39 of the display aperture, where the user may place one or more fingers to feel the Braille dots formed by relative position of pin ends and surface 33. The structure holds the Braille dots firmly in their relative position on wheel 27, preserving readable Braille text. At some point after the dots on a given area of wheel 27 rotate out of reading aperture 39, they come in contact with another physical structure that forces all the pins to a default position, after which the pins rotate back to the writing area (pin setting station 47), where either the actuators are activated to shift the dots into the non-default position, or the actuators are not activated, allowing the corresponding dots to remain in the default position.

The default position may be either all pins raised from surface 33 (for external actuators) or all pins lowered from surface 33 (for internal actuators), the actuators thus being responsible for shifting selected pins to achieve the selected position of pin ends relative to reading surface 33 and reading aperture 39 (raised or lowered) to define the dots creating Braille characters. Utilizing the apparatus of FIG. 6 (default position with all pins lowered) provides the benefit of not requiring actuator function for spaces and the like, any actuator sound the user may hear thus being associated with active production of text.

Figure 8:
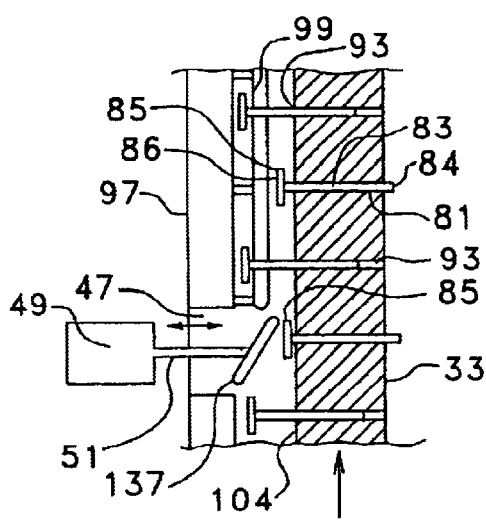
FIG. 8 is a simplified illustration of an actuator embodiment usable in the apparatus of FIG. 6.

The dots are formed by pins 81 that are mechanically quite simple (see FIGS. 6 and 8, for example). Pins 81 are generally nail-shaped including a round shaft 83 with a rounded tip at one end 84 and enlarged head 85 (typically circular, for simplified mechanical behavior) at the other end 86, head 85 having rounded edges. Rounded tips 84 of shaft 83, when pins 81 are in the raised position, represents the Braille dot the user feels. Head 85 is the means by which the positions of pins 81 are controlled. Such pins are mechanically sturdy and reliable and inexpensive to manufacture.

Figure 7:
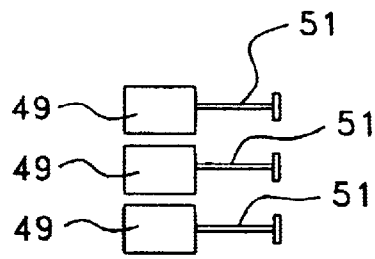
FIG. 7 is a simplified illustration of an actuator grouping usable in the apparatus of FIG. 6.

FIG. 6 illustrates embodiment 91 or the apparatus of this invention configured for application of selected devices illustrated in FIGS. 7 through 22 in a wheel-based streaming Braille display utilizing an internal actuator design (it should be understood that FIG. 6 is for purposes of illustration only, a usable Braille display having many more pins more closely spaced). The outer ring represents rotatable assembly 92 including rotating wheel 27 in which pins 81 are slideably maintained in openings 93 therethrough to reading surface 33 thereat. The inner ring represents non-rotating (static) actuator assembly 95 and includes structure 97 for mounting of actuators 49 (also represented in a linear array in FIG. 7), passive pin retention device 99 and passive default positioning device 101. As wheel 27 rotates, pins 81 are set in position by the actuators 49 at station 47 of structure 97, held in place by the passive retention device (or devices) 99 as the tactile display at surface 33 is streamed through reading area aperture 39 of housing 37, and then returned to a default position (lowered, or retracted from surface 33, in the FIGURE) by passive positioning device 101 to repeat the cycle. Passive retention can be extended any selected distance beyond reading aperture 39. It should be realized that pins 81 could be left in their set position thereafter, thus eliminating the need for passive positioning device 101 to return pins 81 to a default position, employing, for example, bi-directional actuators. Actuator positioning closer to reading area aperture 39 will result in quicker response to user commands since it will take less time for pin position changes implemented at actuators 49 to rotate into the reading area.

Diameter of rotating wheel 27 in a particular embodiment is based on a number of factors. A smaller wheel is more compact (allowing for a smaller package for the entire display) and requires fewer parts (fewer pins 81, for example). A larger wheel allows the reading area of surface 33 at aperture 39 to be less curved, allows more Braille cells to be displayed simultaneously at the reading area (which may be of particular value to users who read Braille with multiple fingers) permitting rapid re-reading of a Braille word before the word moves out of reading area aperture 39. A larger wheel 27 will also exhibit slower wear (and thus longer useful life) since, as wheel size increases, individual pins 81 are cycled fewer times for a given amount of text displayed. The diameter of the wheel is preferably chosen so that an integer number of regulation size Braille (six- or eight-dot) cells with regulation spacing between cells can be precisely fit around the diameter of the wheel. Alternatively, having a noticeable discontinuity at one point on the surface of the wheel logically divides the displayed text into "lines", which a user of linear displays is accustomed to. In such an approach, it is desirable to select a wheel diameter so that the total cell count is some number familiar to readers, such as 40 or 80.

To implement a wheel-based display having an outer rotating assembly 92 and an inner non-rotating assembly 95, wheel 27 of assembly 92 includes outer ring (or rim) 105 mounted on disk 107, with shaft 109 controlling rotation centered through and attached by flange 111 with the face of disk 107 opposite the face on which the outer ring is mounted (shaft 109 being journalled for stabilizing rotation at journal 113 defined in structure 97 of assembly 95). Rotating wheel 27 of assembly 92 is thus cup shaped, with open end 115 of the cup having non-rotating assembly 95 concentrically maintained therein (for example, by securing structure 97 to front wall 117 of housing 37). The non-rotating components are installed at assembly structure 97 utilizing any known methods that provide satisfactory stability, and are precisely positioned within rotating outer rim 105 at their desired positions with respect to inner surface 104 of rotating outer rim 105 and thus pins 81.

Braille cells have either three or four rows of dots (for six-dot or eight-dot Braille, respectively). Thus the display will need three or four rings (endless rows 121) of axially arrayed pins 81, all rings of pins rotating together about the same axis. Each row 121 has its corresponding actuator 49, so either three or four actuators 49 are mounted adjacent to one another at station 47 of non-rotating assembly 95 at the interior of wheel 27, each adjacent to a corresponding row 121 of openings 93.

For both wheel-based and linear displays (discussed below with reference to FIG. 23), it is important that the timing of actuators 49 correspond closely with the position of pins 81 at station 47. If motion is controlled by stepper motor 125, for example, control logic 69 (see FIG. 4) can keep count of the motor pulses to keep track of the relative position of pins 81 and actuators 49. However, given the challenge of selecting the correct initial pulse from which to start counting, and the risks associated with a failed motor action (causing the system to get out of step), a position registration system 127 (for example, periodic bumps or holes 129 in wheel 27 of the display apparatus through which light from source 131 shines on optical detector 133) should be provided to send information to control logic module 69 constituting positive feedback on the relative position of the pin array and actuators 49.

As shown in FIG. 8, a first embodiment of an actuator 49 of the solenoid type for active selective positioning of pins 81 in an endless row 121 of pins from a lowered (retracted from reading surface 33) default position (utilizing the device shown in FIG. 14, for example) to a raised (extended from reading surface 33) position is illustrated. For ease of illustration, the FIGURES that follow will show a segment of the apparatus of this invention as being linear, the curved implementation required for use at wheel 27 employing the same features and principals. The FIGURES are thus numbered accordingly.

If actuator shaft 51 is retracted when a particular pin 81 passes the actuator location at station 47, that pin will remain in the lowered position. If actuator shaft 51 is extended when a particular pin 81 passes actuator 49, then that pin will be moved to the raised position with end 84 protruding forming a dot at surface 33. Passive retention device 99 (discussed below) is placed immediately adjacent to actuator 49 so that pins 81 are retained in whichever position achieved after passage by actuator 49 as pins 81 pass by reading aperture 39.

Element 137 at the end of actuator shaft 51 that contacts selected pins heads 85 is preferably sloped (FIG. 8) relative to the direction of pin travel or rounded (at 139 of FIG. 9) so that if actuator shaft 51 is extended slightly before the pin arrives, the pin can slide (up the slope or around the curved surface) to the raised position, thereby simplifying the timing issues for control of actuator 49. If adjacent pins 81 are both to be moved to the raised position, actuator shaft 51 can safely remain extended during the interval between arrival of the two pins, and both pins 81 will be moved relative to the face of the actuator element 137.

If it is desirable that actuator shaft 51 be retracted in between arrivals of adjacent pins 81 that are to be raised (for example, so that much of the raising operation will be implemented by actuator element 137 pushing pins 81 into position, or if required by the geometry of pins 81 and/or wheel 27), then actuator 49 must be able to cycle at a rate of arrival of pins 81. If the actuator can remain in position between the arrival of pins to be raised, then the actuator need only be able to cycle at half the rate of pin arrival for such activity. This implementation choice, and the maximum cycling frequency of actuators 49 ultimately determine the maximum rate at which pins 81 can be processed, and therefore the maximum rate at which Braille text can be displayed. The type of actuator, the driving voltage, the characteristics of any actuator return spring where necessary in a particular embodiment of the actuator, the mass of the pins and of any linkages, and the friction of the system all affect the maximum functional rate of operation of the actuators.

Element 137 (or alternatives thereto discussed hereinafter) at the end of actuator shaft 51 is designed so that it will not extend far enough toward wheel surface 104 to hook or catch on a pin 81 while in the process of retracting. If the actuator is late retracting or late extending, this may result in a pin that is only partially extended. Overall cooperation of the design of the passive retention devices and timing and geometry of the actuator minimizes the risk of this occurrence and errors or device jamming caused thereby.

Figure 9:
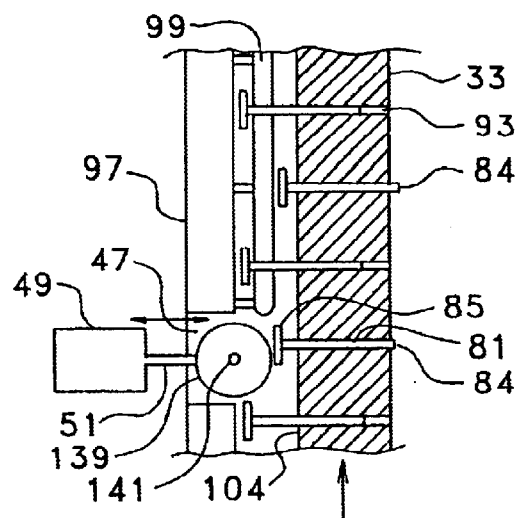
FIG. 9 is a simplified illustration of another actuator embodiment usable in the apparatus of FIG. 6.

One option to further minimize such risk is to place a small wheel 139 on the end of actuator shaft 51, mounted on an axis 141 for rotation (in the direction of pin travel), as shown in FIG. 9. When actuator shaft 51 is extended, pins 81 contact the small wheel 139 and cause it to rotate. This particular construction maneuvers pins 81 thus contacted into the raised position while reducing lateral forces on the pins. The small wheel 139 must be large enough to shift pins 81 by the desired amount and to have a sufficiently shallow angle of initial contact with pin heads 85, yet small enough to avoid interference with adjacent pins. This, in turn, depends in part on the relationship among pin spacing, pin head diameter, and the distance the pins must travel.

The solenoid type actuators shown in FIGS. 8 and 9 are designed to be both extendible and retractable on command, for example utilizing a unidirectional solenoid with spring mounted return motion. An active bi-directional solenoid could also be utilized. The distance of travel of actuator shaft 51, and thus element 137 at the shaft end, is controlled, for example, by stops or other such means to insure conformance to the geometry requirements of the display apparatus 91.

Figure 10:
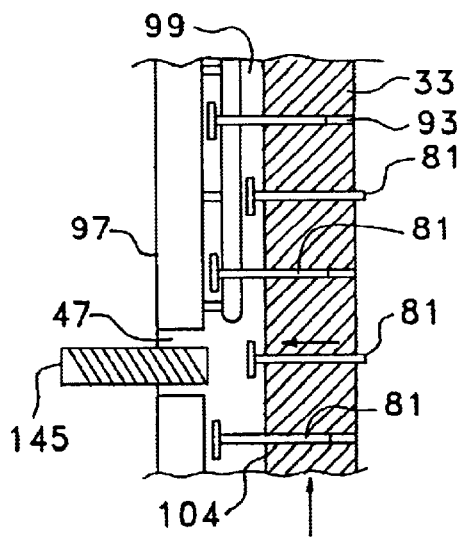
FIG. 10 is a simplified illustration of another actuator embodiment usable in the apparatus of FIG. 6.
Figure 11:
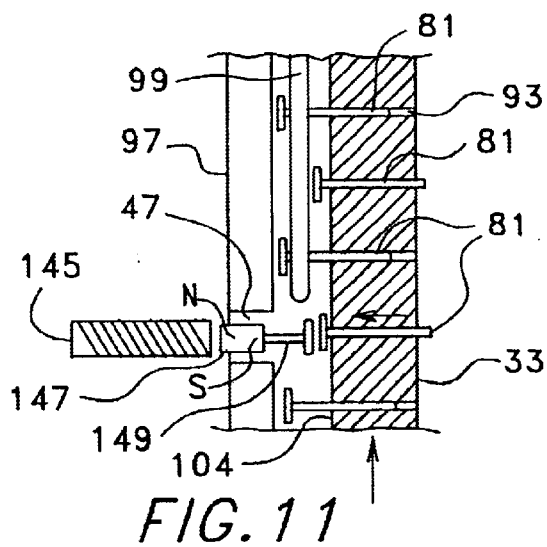
FIG. 11 is a simplified illustration of yet another actuator embodiment usable in the apparatus of FIG. 6.
Figure 12:
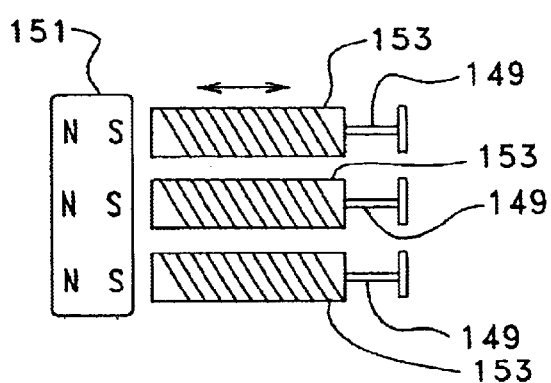
FIG. 12 is a simplified illustration of yet another actuator embodiment usable in the apparatus of FIG. 6.

Alternative actuator designs and implementations are described hereinafter and some are illustrated in FIGS. 10 through 12. Instead of using solenoid type actuators, electromagnetic actuators 145 could be utilized as shown in FIG. 10. The default position of pins 81 would be the raised position (retracted, utilizing the device shown in FIG. 14, for example) and pins 81 would be made of magnetically responsive metal (in other embodiments, the material utilized for the pins is of little consequence so long as they are robust). A bank of electromagnets 145 (the number and arrangement thereof being the same as heretofore discussed) mounted in the nonrotating assembly 95 at station 47 of rotating wheel 27 are selectively activated to cause selected pins 81 to move to the lowered (extended) position. Pins 81 thus function as an element of the actuator in such case. The configuration and strength of electromagnets 145 and the geometry and assembly must be chosen to prevent one electromagnet from shifting unintended pins 81 in the same or adjacent rows 121. Avoiding inappropriate shifting of pins may be assisted by slightly staggering the switching area and electromagnet placement along the path of motion for the different adjacent rows 121, with pins 81 only able to shift in one row at each position (pins in other rows held by a passive retention device 99, for example).

Use of permanent magnets can assist in achieving the goals of maintenance of small actuator size and quick actuator response. Again pin material and geometry are chosen so that pins 81 will not be inappropriately shifted by the electromagnets. Permanent magnets may be incorporated in pin heads 85 and/or shafts 83, with electromagnetic coils at the various activation positions. Alternatively, permanent magnets 147 may be incorporated in actuator shafts 149 operating against fixed electromagnets 145 in an actuator body (electromagnetic polarity switching controlling movement of the shaft) as shown in FIG. 11 (exactly the opposite arrangement, as well as combinations thereof, could as well be utilized). Moreover, one large permanent magnet 151 as a fixed component of an actuator could be utilized in conjunction with three (or four) adjacent movable electromagnets 153 (at actuator shafts 149) to control positioning across the three or four rows 121 of pins 81 (FIG. 12).

Many other actuator configurations may be conceived of without departing from the intended scope of this invention. For example, a sliding spring or Earth's gravity in a lateral shutter arrangement may be used to assist the motion of the pins. In the case of gravity assist, the orientation of the reader in use must be a constant. In the case of spring assist, the pins must be configured with a projection or similar physical feature part of the way along the shaft against which the spring may act. In either case, the actuators are used to operate sliding shutters that move perpendicular to the axes of the pins (i.e., perpendicular to the direction of motion of the pins), opening and closing apertures. When an aperture is closed, a pin moving past is unable to move along its opening and remains in the default position (either raised or lowered depending upon configuration). When an aperture is opened, the spring or gravity assist moves the pin to the non-default position. In either case, the pin is then held in its selected position by a passive position retention device as it moves across the reading aperture.

Another example is similar to the spring-assisted option above, except that the external force to assist or cause motion of pins along their axes is air pressure (i.e., an external source of pressurized air or a source for partial vacuum). A pressurized air source moving the pins to the raised (extended) position would provide the further benefit of cleaning the device and keeping the pin shafts clear of debris.

Other actuator examples utilizable with this invention include rotary actuators (utilizing linkages to convert rotary to linear motion), cam actuators (allowing pins to pass undisturbed on their flat side and rotatable to a position for moving pins relative to their sloped side) and hydraulic actuators. Rotary or cam actuators can be uni-directional or bi-directional in their rotation, should be able to start and stop rotation rapidly, and must be configured for precision positioning. Use of pneumatic or hydraulic actuators may actually provide additional benefits since the bulk of such devices can be physically located at a position other than directly adjacent to the pins. Factors such as compressibility and mass of the working fluid, elasticity of the conduits, and friction should be considered since each will have an effect upon the response time and maximum rate of operation of the apparatus.

Devices for default positioning of pins 81 after reading are shown in FIGS. 13 through 15. Again, for ease of illustration, FIG. 13 and FIGURES following show a linear implementation of the default positioning and position retaining systems (a curved implementation for use at a segment of wheel 27 would employ the same structure and principles). The collection of pins 81 mounted through openings (or apertures) 93 in a block of material forming the readable surface 33, are capable of movement back and forth through the block in their respective openings (in FIGURES and 14, pins 81 that are moved to the right are considered raised, because tips 84 of pins 81 extend beyond reading surface 33 of the block and are thus felt as bumps, or dots, at the surface). The block segment shown in FIGS. 13 and 14 is moving in the direction illustrated by the arrow with respect to a non-moving retaining wall 161 (for example, surface 163 of structure 97 in FIG. 6) to which the positioning devices are attached and that limits the extent to which pins 81 can be retracted. As they approach the default positioning devices, pins 81 may be in either the raised or lowered positions.

FIG. 13 shows default positioning device 165 including ramp structure 167 affixed at the non-moving portion (i.e., structure 97). As wheel 27 moves past ramp 167, pins 81 that were in the lowered position are forced into the raised position. Pins that are already in the raised position are unaffected. The result is that all of the pins are forced into the raised position (extended from the surface) as they pass ramp 167, and are kept in that position by extending the end of the ramp along the direction of travel as is needed until acted upon by an actuator (external as in FIG. 2 or magnetic as in FIG. 10, for example). Note that in a Braille display, the passive system that positions and holds pins in the raised position and the length of the pins must be sufficiently tightly controlled to meet the dimensional specifications for a raised Braille dot.

In FIG. 14 a different type of device (101 as used in FIG. 6) is shown. Passive ramp structure 169 is used to force all of the pins to the lowered position (retracted from surface 33). Since pin shafts 83 must be able to pass unhindered through ramp structure 169, ramp structure 169 includes plural ramp elements 171 defining slots 173 between element 171 (as shown in FIG. 15 for only three rows 121 of pins 81, it being understood that a similar ramp structure for four rows of pins could be provided). Slots 173 are wide enough to allow passage of pin shafts 183, but narrow enough to allow ramp engagement of pin heads 85. Pins 81 in the lowered (retracted) position can be recessed well below the surface of the block of material, so pin configuration is not as critical for proper Braille reading as would be true for positioning of raised pins. Ramp elements 171 include a leading edge 175 at surface 104 of the block to engage pins 81 in slots 173 (thus the necessity for pin heads with rounded edges to assure smooth engagement). As wheel 27 passes ramp 169, pins 81 are borne away from the surface 104 by their heads 85.

FIGS. 16 and 17 illustrate use of passive device 99 to retain pins 81 in raised or lowered position for user reading, in whichever position they are in when they encounter device 99. Leading edge 179 of device 99 is rounded or pointed or both to minimize the risk that a partially extended pin could jam the device (and thus the entire system). If a pin 81 is in the raised (extended) position, retaining device 99 maintains the pin thereat at top face 181 of head 85, resisting external forces such as gravity, vibration, and finger pressure to retain the dots in a readable position with end 84 protruding from surface 33. If a pin 81 is in the lowered position, the retaining device holds the pin in place by underface 183 of head 85 and shaft 83 of the pin passes through slot 185 formed by retainer elements 187 of retaining device 99 (FIG. 17, only one retaining slot 185 being shown for one of the three or four rows 121 of pins 81, it being understood that side by side elements 187 forming sufficient such slots 185 for all rows 121 would be provided).

Retaining device 99 serves multiple purposes. It separates pins 81 into distinct raised or lowered positions, allowing the maximum tolerance for pins that may not be in precisely the correct position as they approach and encounter retaining device 99. It minimizes the risk of a pin jamming in an intermediate position and holds the raised pins with a tight tolerance while they pass through the reading aperture to assure that rounded ends 84 of pins 81 are a correct height above surface 33 of wheel 27 to serve as detectable Braille dots. Retaining device 99 is preferably narrower and/or more centered (relative to pin length at full retraction) at leading edge 179 of the device to better separate pins 81 into retracted or extended states, and is preferably thicker, and thereby closer to wheel surface 104 in the reading area for precise position control of raised pins 81. Depending upon the dimensions of pin heads 85 with respect to the pin shaft 83 diameter, it may be sufficient to have passive position retention device 99 contact only one side of the pin (head and shaft) thereby eliminating the redundant elements 187 of the device utilized to define slots 185.

For all passive positioning devices 165, 101 and 99 shown hereinabove, pin head 85 configuration is important. The various ramps and elements that provide pin raising, lowering and/or retention must be able to contact underface 183 of pins 81 if they are to be lowered (retracted) or retained, and must be able to slide along the pin edge smoothly if they are to be raised (extended).

In particular, where a pin 81 is so extended as to be in contact with surface 104 of wheel 27, a ramp structure 169 utilized for retracting the pin must be able to be inserted between pin head 85 and surface 104 at its leading edge 175. In addition to the edges of pin heads 85 being well rounded or otherwise sloped, a thin ridge of material 191 is preferably incorporated with pins 81 (a collar as shown in FIG. 18) and/or at openings 93 at surface 104 of wheel 27 (a surrounding lip as shown in FIG. 19) to prevent pin movement to a fully flush position with surface 104 and allow a gap for more ready acceptance of leading edge 175 of ramp structure 169.

Figure 20:
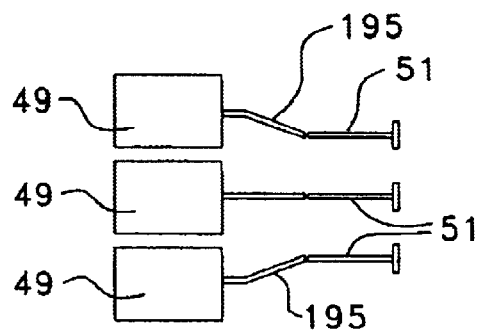
FIG. 20 is a simplified illustration of an actuator grouping implementation usable with the apparatus of FIG. 6.
Figure 21:
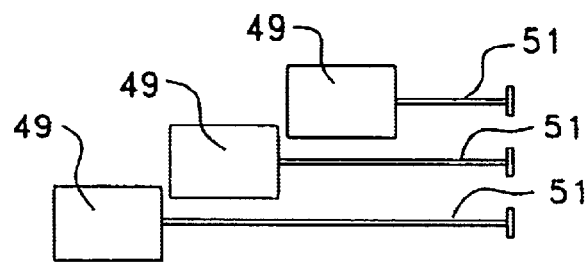
FIG. 21 is a simplified illustration of another actuator grouping implementation usable with the apparatus of FIG. 6.

In the event of geometric constraints, for example the diameter of each of the actuators 49 being greater than the spacing between adjacent rows 121 in a Braille cell, methods can be used to concentrate the effects of the multiple actuators 49 down into the space required (i.e., to fit the actuators to the available space). Some such methods include use of shaft linkages 195 (mechanical or flexible linkages, for example) as illustrated in FIG. 20, or utilization of different pin and/or actuator shaft 51 lengths (see FIG. 21, for example, wherein actuators 49 are staggered and employ different shaft 51 lengths).

Figure 22:
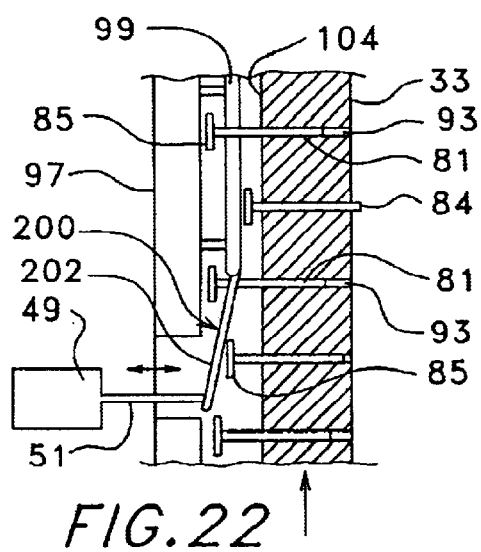
FIG. 22 is a simplified illustration of a combination actuator/position retention device alternatively usable with the apparatus of FIG. 6.

FIG. 22 shows a combination actuator/passive position retention device 200 that includes a flexible or hinged extension 202 positionable by actuator 49 to act as a ramp, guiding pins 81 that contact the ramp from a default position to a non-default position. When extension 202 is raised by actuator shaft 51, pin heads 85 pass underneath it and remain in the default position. The connection between actuator shaft 51 and extension 202 is offset relative to a line defined by a row 121 of pins 81 so that the moving pins do not impact actuator shaft 51. This permits use of a relatively long ramping and, thus, a relatively shallow slope to move pins 81. Changes in position of extension 202 while pins 81 are in transit therealong will cause those pins on the ramp defined by extension 202 to be immediately shifted by some amount but will not effect the final positions of the pins in the reading aperture.

The construction of rotatable outer rim 105 of FIG. 6 can be single piece, with pin shaft openings 93 drilled or molded, or multiple piece, one or two ring layers per row 121 of Braille pins. If assembly 92 is placed in an assembly workstation with drive shaft 109 pointed down, pins 81 may be inserted in openings 93 of outer rim 105 and then rotating assembly 92 lowered down and fitted into place in housing 37. Non-rotating assembly 95 will prevent pins 81 from falling out of outer rim 105 once it is in place.

Figure 23:
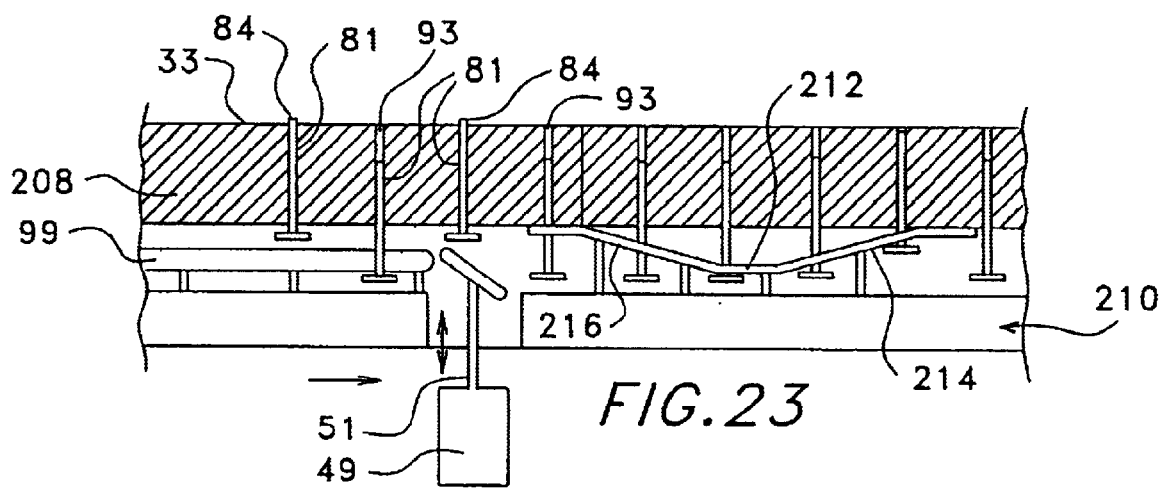
FIG. 23 is a simplified illustration of a linear tactile display apparatus in accord with this invention.

The techniques described for a wheel-based display could also be applied to a more conventional structure of a line display. As shown in FIG. 23, pins 81 can be placed in a linear, nonmoving matrix 208 at a housing (not shown), and assembly 210 moved underneath pin matrix 208 to set pins 81 and thus the Braille dots as heretofore disclosed. Moving assembly 210 includes a passive pin default positioning device 212 (a two ramp structure generally of the type shown in FIGS. 14 and 15 for lowering pins 81), followed by actuators 49 (one for each row of pins, three or four total for the entire line) and passive pin position retention device 99. Assembly 210 as shown moves from left to right, with establishment of pin default position being assured at forward ramp 214 of device 212, writing and fixing the Braille text as it moves. When the user is finished reading the line of Braille text streamed across reading area 33 and signals for a refresh, moving assembly 210 travels back (from right to left in the FIGURE), with actuator shafts 51 retracted. The reversed ramp 216 of passive default positioning device 212 lowers any pins 81 that were raised to allow passage of passive default positioning device 212 during return.

Instead of device 212, pin reset can be performed as a separate function, for example by a roller or magnet that sweeps across the display area. Additionally, it may be desirable to shield the part of the line of Braille text being written from finger contact, by a protective cover over the section of the display that is being written (at actuator 49) and that follows the position of the moving actuator or actuators. The cover should not prevent tactile access to pins 81 that have already been set and that are being held in place by retention device 99. With such a cover in place, the actuators that set the pins need not work against finger pressure, permitting faster writing action, with lower powered actuators. Actuators 49 that set pins 81 need not be mounted directly on assembly 210. Mechanical linkages to assembly 210 responsive to actuators 49 located at a fixed position could be conceived to drive a mechanical pin setting apparatus at assembly 210.

Passive pin retention device 99 is configured to be as long as the entire line of Braille cells in the display. Thus the entire Braille display assembly in this case will be more than twice as long as the line of Braille displayed. If, however, the passive pin retention device is made of strips of flexible material, supported along the sides away from the pins and of sufficient flexibility to support large-radius curves along its length but sufficiently stiff to prevent lateral flexing (steel tape for example), then the strips may be guided along tracks, grooves and/or wheels to wrap around under the moving assembly and thus extend to at its end in the direction opposite the direction of actuator movement. This would allow a linear display to be built with a total length not much greater than the length of the line of Braille displayed. If the material forming the retention device were even thinner and more flexible, the retention device could be maintained, fed from and reloaded at a spring-loaded roller.

A linear display would display a line at a time, and the line would be scanned in from one end to the other, unlike the near-simultaneous update possible with the conventional linear displays that use a separate actuator for each dot. However, with fast actuators, the time to write an entire line would be relatively short. Given the savings achievable in cost of the linear device of this invention due to the greatly reduced number of actuators, the time delay is felt to be acceptable.

Any degree of friction in the display system of this invention increases the amount of energy required to operate the display and increases the potential for wear of parts. A certain amount of friction in the motion of the pins along their shafts may be desirable to prevent the pins from slipping out of position during text or other tactile display cycling (i.e., during the transition from actuator to retaining device, from retaining device to passive positioning device, and from passive positioning device to actuator), thus rendering the device less susceptible to outside influences of gravity and vibration. A certain amount of friction in the system can also reduce the risk of build-up of internal vibrations leading to excessive system noise, timing errors and damage.

With these factors in mind, production of the display should take into account both the friction and the wear resistance of the components. Some form of lubrication is desirable (for example, a dry powder lubricant such as graphite or, where stiffening of component movement is desired, various known greases). Friction may be introduced into the system in a controlled manner at the transition points in the display cycle by application of a soft, compressible material such as felt, for example.

Pin shafts with a circular cross-section may have a tendency to rotate in their openings as the wheel rotates. This will not affect readability of the display at the viewing aperture, but may result in a risk of accelerated or uneven wear of the pin or the opening in which the pin moves. Pin rotation can be eliminated by utilization of pin and opening configurations defined by a non-circular cross-section.

Figure 24:
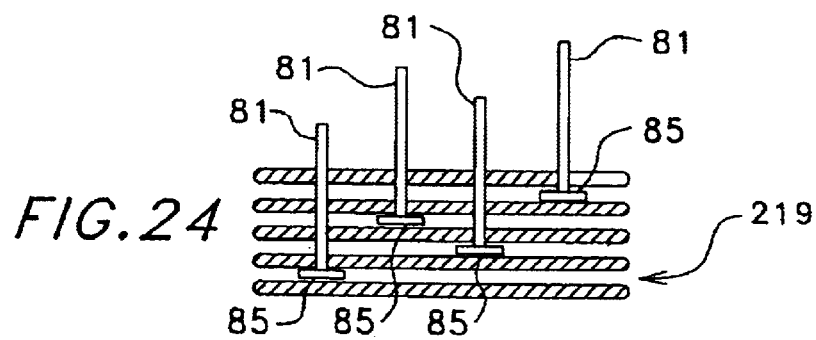
FIG. 24 is a simplified illustration of a position retaining device used to retain multiple pin elevations in apparatus of this invention.

Conventional Braille uses two dot levels, extended (dot) and retracted (no dot). It is possible to generate additional levels, however, for other application utilizing the display device of this invention by employing actuators capable of multi-position extension and multiple position retention devices 219 (as illustrated in FIG. 24, replacing the two position devices as shown in FIGS. 16 and 17, for example).

Turning now to FIGS. 25 through 28, embodiments of this invention configured to allow extensive actuation of pins no matter direction of travel of the cylinder (or relative direction of travel of actuators and pins in other embodiments) are shown. In these FIGURES, it should be understood that the illustration of the embodiments have been greatly simplified, but that all elements previously discussed (particularly with reference to FIG. 6) can be and are applied in the embodiments discussed hereinbelow unless otherwise noted. In particular, the various actuator (at least in part) and pin embodiments discussed are understood to be applicable herein as are the various position retaining devices heretofore discussed. It is desirable, however, for at least some of the embodiments discussed below to eliminate the various passive default pin positioning devices heretofore discussed for reset of the pins.

Figure 25:
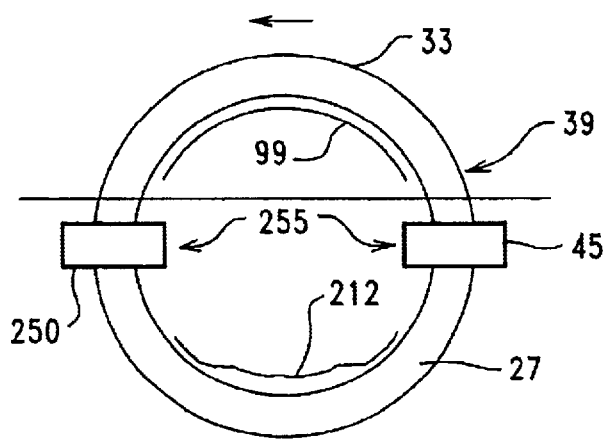
FIG. 25 is a simplified diagrammatic illustration showing a first embodiment of a bi-directional implementation of the apparatus of this invention.
Figure 26:
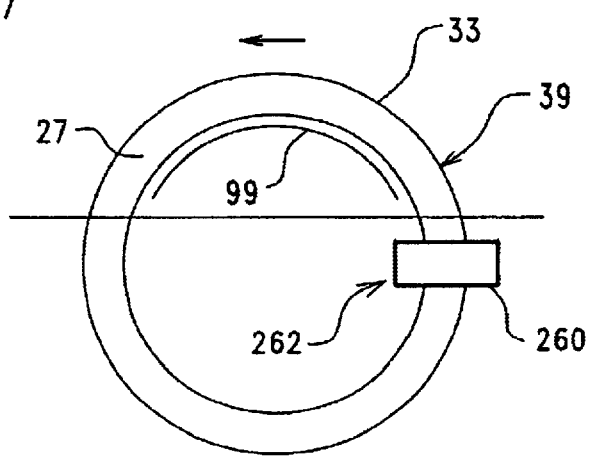
FIG. 26 is a simplified diagrammatic illustration showing a second embodiment of a bi-directional implementation of the apparatus of this invention.

A first embodiment of the apparatus and method utilizing bi-directional relative movement for implementation of a refreshable tactile display is illustrated by FIG. 25, wherein passive reset of rows 121 of pins 81 in openings 93 as heretofore described (for ease of illustration, none are shown in FIG. 25 or 26; refer to FIG. 6) is accomplished with a two ramp default positioning device 212 (as discussed with respect to FIG. 23). Device 212 is located between assembly 45 and a second set, or assembly, 250 of actuators much like assembly 45, the two assemblies together comprising an actuator station 255.

The arrow shows the direction of normal rotation of cylinder 27 for normal reading and advancement of the Braille text, with pins being set by actuator assembly 45, assembly 250 being inactive. If the user wishes to re-read text that was displayed at reading, or display, area 39 on surface 33 but which has already passed from display area 39 (effectively reading backward), the direction of rotation of cylinder 27 is reversed by the user at user input 75 of controller 65, and the second set of actuators 250 sets the pattern of Braille text as far back as the user wishes to read (assembly 45 remains inactive during this period) under the control of properly programmed control implementation 65/driver 81 (FIG. 4). Position retaining device 99 and default positioning device 212 operate as before and are accessible in either direction of cylinder rotation.

FIG. 26 shows another implementation of a bi-directionally rotatable cylinder for streaming Braille text in either forward or backward order at display area 39, with only a single set, or assembly, 260 of actuators at station 262. In this case actuators that can set or reset pins, regardless of the initial positions of the pins, by contacting and moving a pin in either direction in its opening. This design takes advantage of the fact that the user does not expect any text that has already been read to change, so with no automatic reset, all of the text that is at the bottom of the cylinder (outside of the reading area) is still readable if the direction of the rotation of the cylinder is reversed. The single set of actuators 260 is therefore used for both forward and reverse writing (under the control of properly programmed control implementation 65/driver 81), and the user reading the Braille text can thus request movement arbitrarily far forward or backward along the line of text by controlling cylinder rotation at user input 75 of controller 65 (FIG. 4). Again, position retaining device 99 operates as before and is accessible in either direction of cylinder rotation.

Figure 27:
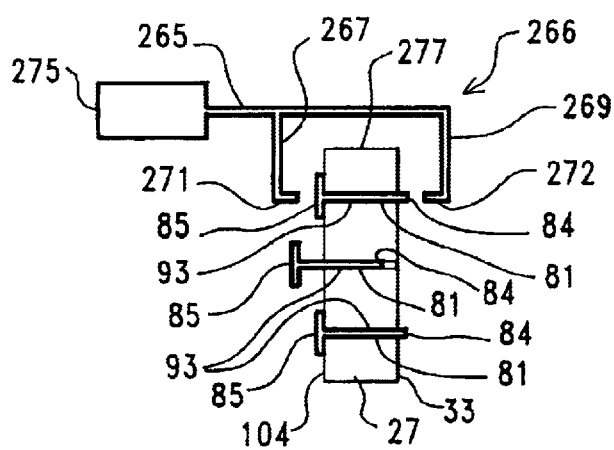
FIG. 27 is a simplified diagrammatic illustration showing an actuator for an actuator grouping implementation usable with the apparatus of FIG. 27.
Figure 28:
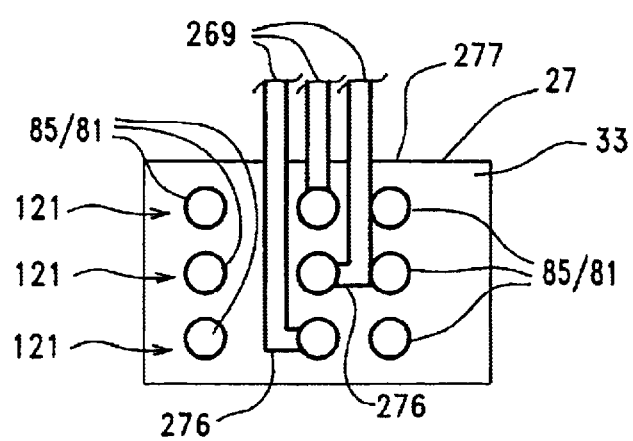
FIG. 28 is a simplified diagrammatic illustration showing an offset arrangement for an actuator assembly as shown in FIG. 27.

FIG. 27 illustrates one way to implement the array of dual directional actuators 260 to control position of pins 81. Actuator shafts 265 of individual actuators 266 in assembly 260 (only one of which is shown in FIG. 27 for ease of illustration) are configured with arms 267 and 269 each having a contact tip 271 and 272, respectively, thereat. Actuators 266 are positioned so that contact tips 271 and 272 are located to provide the ability for the actuator to push either head 85 (by contact tip 271 at inner cylindrical surface 104) or pin tip 84 (by contact tip 272 at cylindrical outer surface 33) of each pin 81, causing pin 81 to be extended or retracted in opening 93, regardless of the initial position of the pin. Bi-directional mechanical drivers 275 for extending and retracting shafts 265 can be used. Alternatively, in some embodiments, a single-directional driver with high speed return mechanism, such as a spring, could be utilized. FIG. 28 illustrates a portion of assembly 260 of actuators 266 showing one construction of shaft arms 269 thereof (arms 267 would be similarly constructed) providing offset constructs 276 at the end of some of the shaft arms (in advance of contact tips 271 and 272) in assembly 260 so that all pins 81 across rows 121 of pins in the Braille cells can be controlled.

It should be appreciated, as made evident in FIGS. 27 and 28, that drivers 275 of individual actuators 266 in assembly 260 are not, as heretofore taught, positioned inside cylinder 27 (as illustrated in FIG. 4). Instead, the drivers must be positioned so that actuator shafts 265 move adjacent to one circumferential edge 277 (either inside or outside) of cylinder 27, thus allowing arms 267 and 269 access at either side of pins 81, one arm above surface 33 and one arm below surface 104 of cylinder 27. Moreover, while actuator assemblies 250 and 45 in combination with default positioning device 212 are illustrated in FIG. 25, device 212 could be eliminated from this embodiment by providing dual directional actuator assemblies 260 in place of assemblies 250 and 45.

Use of either embodiment having dual directional actuators as taught herein (using either a single actuator assembly or a pair of actuator assemblies) preferably employs static actuators in an actuator assembly at least equal in number to the rows of openings through the cylinder, with pins in the rows thereby being selectively contactable by different ones of the actuators in an assembly during cylinder rotation in either forward or reverse direction so that the tips of the pins are selectively positioned relative to the surface of the cylinder in the display area. In this way Braille text is selectively streamed across the display area in either forward or backward order depending upon direction of cylinder rotation.

The use of a bi-directional actuation mechanism as described herein can also be used with the linear or multiline display device of this invention (as shown in FIG. 23). Use of bi-directional actuation would eliminate the need for a separate pin reset device (212 in FIG. 23), and allow the write head assembly (210 in FIG. 23) to operate in both directions. For example, an actuator assembly 260 discussed above could write one line of Braille on a left to right sweep across the line of the display, then write the next line on the return (right to left) sweep. Such an implementation of the device shown in FIG. 23 would require a modification of the pin retention device 99 to provide a pin retention device that could track the actuators at assembly 210 from both the right and left and that could be released independent of the motion of the write head assembly.

As may be appreciated, the various line displays in accord with this invention could be combined in a single unit to produce multi-line displays. A single set of actuators could be shifted between pin set arrays to write a line at a time in sequence (separate pin retention and default positioning devices would be required for each pin set array, separate motors for each pin set array utilized to retract all the pin position retention devices simultaneously, thus speeding page refresh).

Alternative configurations of the wheel or cylinder based display could include configuration with the inner surface of the wheel as the reading surface rather than the outer surface (with appropriate provision of a reading aperture adjacent to the inner surface of the outer ring). Such configuration would simplify positioning of the non-rotating parts since they would be mounted outside the wheel rather than inside it. Another alternative configuration would include an optional user preprogrammed stop/start mode which would cause the Braille wheel to stop rotation at selected intervals until prompted by the user, allowing the user to read text of the selected length while the wheel is motionless.

The linear or wheel-based displays of this invention could be used for graphic applications by provision of more than three or four rows of pins. In such case, graphic capabilities would be enhanced by the ability to achieve multi-level positioning of the pins as discussed hereinabove with respect to FIG. 24. Use of an elastic sheet stretched over the display area could be used to smooth out irregularities of the display caused by the discrete placement of the pins. Furthermore, non-display applications are possible utilizing the principles herein disclosed, for example in the field of mechanical data storage or other MEMS applications.

What is claimed is:

1. A refreshable Braille reader comprising:

a display assembly having an outer surface, said surface having a plurality of openings therethrough with said openings arranged at said surface in rows;

a plurality of pins having first and second ends, each one of said pins mounted in a different one of said openings and movable therein; and actuating means maintained at a station adjacent to said surface of said display assembly for moving said pins, said pins selectively contactable by said actuating means to move said pins in said openings so that said first ends of said pins are selectively raised from or not raised from said surface, at least one of said actuating means and said display assembly being movable relative to the other of said actuating means and said display assembly in either of two directions, said actuating means capable of causing controlled pin movement in said openings while relative movement occurs in either of said two directions.

2. The Braille reader of claim 1 wherein said actuating means includes at least a first actuator assembly having actuators at least equal in number to number of said rows of said openings, each said actuator including a driver, a shaft selectively extendible and retractable by said driver and first and second contact tips at said shaft, said contact tips of each said actuator in said actuator assembly positioned relative to said pins in a said row so that said first contact tip can selectively contact said first ends of said pins and said second contact tip can selectively contact said second ends of said pins.

3. The Braille reader of claim 2 wherein said actuators in said actuator assembly each include first and second arms extending between said shaft and said first and second contact tips, respectively, said first arm for location at one side of said display assembly and said second arm for location at an opposite side of said display assembly.

4. The Braille reader of claim 2 wherein at least some of said actuators in said actuator assembly include offset constructs allowing side by side placement of said actuators while accommodating access by different actuators to said pins in different said rows.

5. The Braille reader of claim 1 further comprising a static position retainer adjacent to said surface of said display assembly for passively securing position of said pins during a selected extent of said relative movement between said actuating means and said display assembly.

6. The Braille reader of claim 5 wherein said pins each include a head at said second end and a shaft between said first and second ends, and wherein said static position retainer includes retainer elements at least equal in number to said rows of openings at said surface of said display assembly, said pin heads retained at one side or the other of said retainer elements during pin presentation to a reader.

7. The Braille reader of claim 5 wherein said actuating means includes at least first and second actuator assemblies each having actuators at least equal in number to number of said rows of said openings, said first actuator assembly positioned at one side of said static position retainer and said second actuator assembly positioned at an opposite side of said static position retainer, said first actuator assembly selectively causing controlled pin movement in said openings while relative movement occurs in a first of said two directions and said second actuator assembly selectively causing controlled pin movement in said openings while relative movement occurs in a second of said two directions.

8. The refreshable Braille reader of claim 7 further comprising a passive pin positioner for returning pins to a preselected default position relative to said outer surface of said display assembly, said passive pin positioner located between said first and second actuator assemblies.

9. The refreshable Braille reader of claim 1 further comprising a motor adapted for effecting said relative movement of said actuating means and said display assembly and a controller connectable with a text driver, wherein said motor and said actuating means are connected with said controller for controlling said relative movement and selected actuating means contact with said pins.

10. A refreshable Braille reader comprising:
a cylinder connected with a motor for rotation thereof in either of two directions, said cylinder having a cylindrical outer surface a part of which defines a tactile display area and a cylindrical inner surface, said cylinder having a plurality of openings therethrough between said surfaces, said openings arranged in at least three endless rows;
a plurality of pins having first and second ends, each one of said pins mounted in a different one of said openings and movable therein;
static actuators at least equal in number to said rows of openings through said cylinder maintained at a station adjacent to said cylinder, said actuators positioned and configured so that said pins are selectively contactable at either of said ends by different ones of said actuators during cylinder rotation in either of said two directions so that said first ends of pins are selectively positioned relative to said outer surface of said cylinder thereby streaming Braille text across said display area in either forward or backward order depending upon selected direction of cylinder rotation; and
user controls allowing control at least of direction of rotation of said cylinder.

11. The Braille reader of claim 10 wherein each said actuator includes a selectively extendible and retractable shaft and first and second contact tips at first and second arms, respectively, extending from said shaft, said first arm for location adjacent to said outer surface of said cylinder and said second arm for location adjacent to said inner surface of said cylinder, said contact tips of each said actuator positioned relative to said pins in a said row so that said first contact tip can selectively contact said first ends of said pins and said second contact tip can selectively contact said second ends of said pins.

12. The Braille reader of claim 10 wherein at least some of said actuators include offset constructs allowing side by side placement of said actuators while accommodating access by different actuators to said pins in different said rows.

13. The Braille reader of claim 10 wherein said actuators include at least first and second sets of actuators, each said set having actuators at least equal in number to number of said rows of said openings with said first actuator set positioned at one side of said tactile display area and said second actuator set positioned at an opposite side of said tactile display area, said first actuator set selectively causing controlled pin movement in said openings for steaming Braille text in said forward order and said second actuator set for causing controlled pin movement in said openings for streaming Braille text in said backward order.

14. The Braille reader of claim 10 further comprising a static position retainer adjacent to said inner surface of said cylinder opposite said part of said outer surface of said cylinder for passively securing position of said pins during rotation through said display area.

15. A method for streaming Braille text in either forward or backward order at a display area comprising the steps of:
effecting relative movement in either of two directions between a station and a display surface;
selectively activating actuators at said station while effecting said relative movement in a first of said two directions to set pins at selected positions relative to said display surface by contact with said pins;
effecting relative movement in either said first or a second of said two directions to selectively reset said pins at selected positions relative to said display surface by selectively activating said actuators at said station to cause contact with said pins; and
movement of said pins relative to said display surface in either of said two directions of relative movement occurring only by selective contact from said actuators.

16. The method for streaming Braille text of claim 15 wherein said relative movement is rotary movement.

17. The method for streaming Braille text of claim 15 further comprising the steps of monitoring relative location of said actuators and said display surface pin positions and controlling said relative movement and actuator activation in response thereto.

18. The method for streaming Braille text of claim 15 further comprising the step of passively retaining position of said pins after setting by said actuators and during display at said display surface by physically restraining pin movement.

19. The method for streaming Braille text of claim 15 wherein pin setting while relative movement occurs in said first of said two directions is effected by a first set of actuators and wherein pin setting while relative movement occurs in said second of said two directions is effected by a second set of actuators.

20. The method for streaming Braille text of claim 15 wherein said pins have first and second ends and wherein said pins are selectively contactable at either of said ends by different ones of said actuators during said relative movement in either of said two directions thereby selectively streaming Braille text across said display surface in either forward or backward order depending upon direction of said relative movement.

21. A method for streaming Braille text in either forward or backward order at a display area comprising the steps of:
   effecting relative movement in either of two directions between a station and a display surface;
   selectively activating actuators at said station while effecting said relative movement in a first of said two directions to set pins at selected positions relative to said display surface by contact with said pins;
   effecting relative movement in either said first or a second of said two directions to selectively reset said pins at selected positions relative to said display surface by selectively activating said actuators at said station to cause contact with said pins; and
   wherein pin setting while relative movement occurs in said first of said two directions is effected by a first set of said actuators and wherein pin setting while relative movement occurs in said second of said two directions is effected by a second set of said actuators.

22. A method for streaming Braille text in either forward or backward order at a display area comprising the steps of:
   effecting relative movement in either of two directions between a station and a display surface;
   selectively activating actuators at said station while effecting said relative movement in a first of said two directions to set pins having first and second ends at selected positions relative to said display surface by contact with said pins;
   effecting relative movement in either said first or a second of said two directions to selectively reset said pins at selected positions relative to said display surface by selectively activating said actuators at said station to cause contact with said pins; and
   wherein said pins are selectively contactable at either of said ends by different ones of said actuators during said relative movement in either of said two directions thereby selectively streaming Braille text across said display surface in either forward or backward order depending upon direction of said relative movement.

23. The method f or streaming Braille text of claim 22 further comprising the step of passively retaining position of said pins after setting by said actuators at least during display at said display surface.

24. The method for streaming Braille text of claim 22 wherein said relative movement is rotary movement, said method further comprising the steps of monitoring relative location of said actuators and said selected positions of said pins relative to said display surface, and controlling said rotary movement and actuator activation in response thereto.

* * * * *